United States Patent [19]

Annen et al.

[11] Patent Number: 5,137,706

[45] Date of Patent: Aug. 11, 1992

[54] CRYSTALLINE COMPOSITIONS

[75] Inventors: Michael J. Annen; Mark E. Davis, both Blacksburg, Va.

[73] Assignee: Mobil Oil Corporation, Fairfax, Va.

[21] Appl. No.: 654,432

[22] Filed: Feb. 12, 1991

[51] Int. Cl.$^5$ ............................................. C01B 33/20
[52] U.S. Cl. ............................. 423/326; 423/328; 502/60; 502/62; 208/46
[58] Field of Search .............. 423/328, 329, 330, 326, 423/118; 502/77, 60, 64, 62; 208/46

[56] References Cited

U.S. PATENT DOCUMENTS

| | | | |
|---|---|---|---|
| 3,950,496 | 4/1976 | Ciric | 423/328 |
| 4,329,328 | 5/1982 | McAnespie et al. | 423/333 |
| 4,670,617 | 6/1987 | DeSimone et al. | 585/467 |
| 4,941,963 | 7/1990 | Valyocsik | 423/328 |

FOREIGN PATENT DOCUMENTS 1122916 10/1989 Japan .

OTHER PUBLICATIONS

Taylor, "The Dehydration of Hemimorphite," The American Mineralogist, vol. 47, Jul.-Aug. 1962, pp. 932-945.
Brunner et al., "Framework density distribution of zeolite-type tetrahedral nets," Nature, vol. 337, Jan. 12, 1989, pp. 146-147.
Davis, "Multidimensional large pores," Nature, vol. 337, Jan. 12, 1989, p. 117.
Lawton et al., "Framework Topology of ZSM-18, a Novel Zeolite etc.," Science, vol. 247, Mar. 16, 1990, pp. 1319-1322.
Zeitschrift fur Kristallographie, Bd. 146, S. 241-259 (1977), copyright by Akademische Verlagsgesellschaft, Wiesbaden 1977, "A neutron-diffraction study of hemimorphite" by Roderick J. Hill, Gerald V. Gibbs, James R. Craig, all of Dept. of Geological Sciences, Virginia Polytechnic Institute and State Univ. Blacksburg VA; Fred K. Ross of Dept. of Chemistry, VPI, Blacksburg VA; and Jack M. Williams, Chemistry Division, Argonne National Lab., Argonne IL.

Primary Examiner—R. Bruce Breneman
Attorney, Agent, or Firm—Alexander J. McKillop; Charles J. Speciale; Laurence P. Hobbes

[57] ABSTRACT

Crystalline compositions, e.g. zincosilicates, which contain 3-membered rings and have a framework density (FD) of less than 21 tetrahedral atoms per cubic nanometer, and their method of preparation are disclosed. The compositions may be used as ion-exchangers, adsorbents, catalysts, e.g. hydrocarbon conversion catalysts, and catalyst supports.

18 Claims, 4 Drawing Sheets

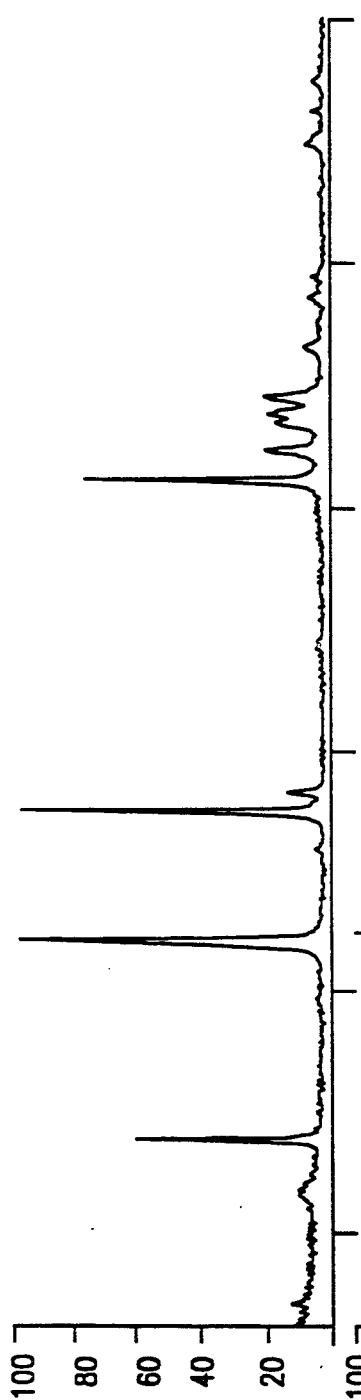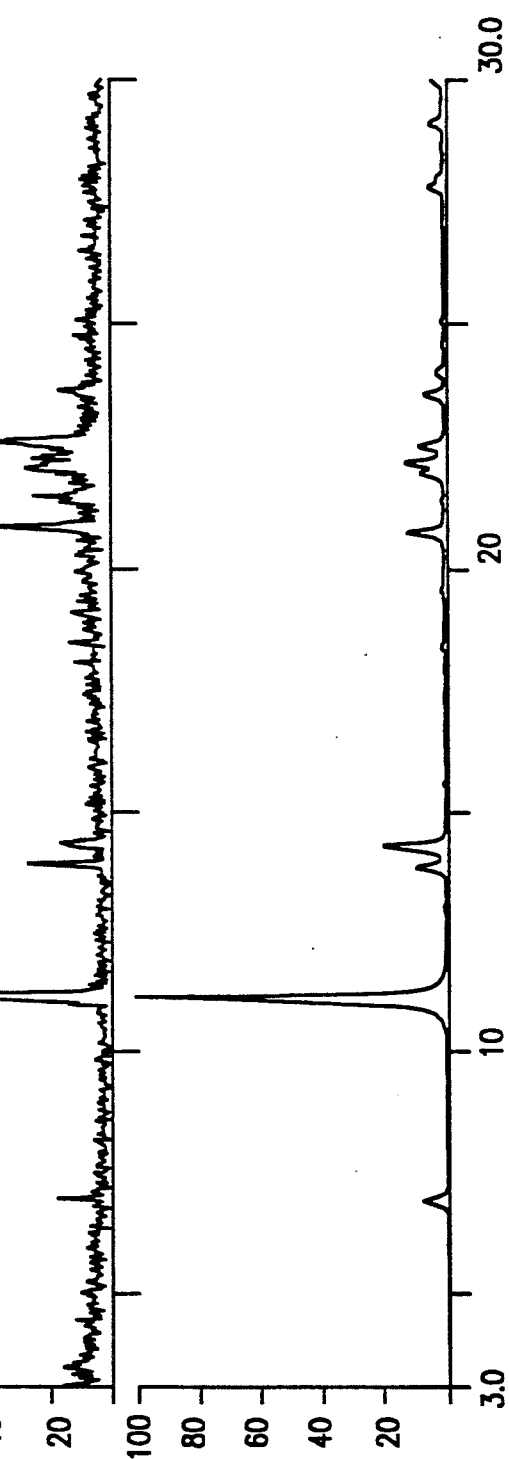

CRYSTALLINE COMPOSITIONS

BACKGROUND OF THE INVENTION

1. Field of the Invention

This invention relates to novel synthetic crystalline compositions, e.g. zincosilicates, which contain within their framework 3-membered rings and which have a framework density (FD) of less than 21 tetrahedral atoms per cubic nanometer. The compositions, which exhibit characteristic X-ray diffraction patterns, may be used as ion-exchangers, adsorbents, catalysts, e.g. hydrocarbon conversion catalysts, and catalyst supports.

2. Discussion of the Prior Art

Zeolites and zeolite-like materials comprise a broad range of microporous, crystalline solids whose main uses are as adsorbents, catalysts and ion exchangers. Differences among such materials exist relative to pore size, shape and capacity which result in certain zeolites being particularly suited for particular functions.

The basic building blocks of zeolites are often tetrahedra of $SiO_4$ and $AlO_4$, which connect to form complex networks of one-, two- or three-dimensional molecular-sized tunnels. The pores can be used to sort molecules, and their surfaces to catalyze reactions.

Brunner and Meier (*Nature*, 337, 146 (1989)) show a correlation between the minimum framework density (FD) defined as the number of tetrahedral atoms (T-atoms) per cubic nanometer and the smallest ring size in the framework. Clearly, the FD is related to the void volume of the crystal: as the FD decreases, the void volume or capacity for adsorption increases. The minimum known FD is 12.5 which corresponds to the void occupying just over half the crystal volume. Materials with an FD more than 12 usually contain rings consisting of 4 or more T-atoms (4-membered rings). The exceptions are ZSM-18 which possesses 3-membered rings (see Stephen L. Lawton and Wayne J. Rohrbaugh, "The Framework Topology of ZSM-18, a Novel Zeolite Containing Rings of Three (Si,Al)-O Species," Science, Vol. 247, pp. 1319–1322 (1990)), and lovdarite, disclosed by Merlino, S. in *Acta Cryst.* A37. C189 (1981), which possesses 3-membered rings, some of which have T-atoms shared by 4-membered rings. The beryllosilicate lovdarite has the empirical formula $K_4Na_{12}(Be_8Si_{28}O_{72}) \cdot 18H_2O$.

If the correlation between the minimum FD and ring size is correct, then zeolitic materials with 3-membered rings must be synthesized to achieve materials with a larger void volume (higher capacity).

VPI-5, an aluminophosphate, has an 18-membered ring structure with an FD of 14.2, and contains 4-membered rings, see Davis, M. E. et al. *Nature* 331, 698–699 (1988). This material has a one-dimensional channel system circumscribed by the 18-membered rings. It has been speculated by Meier in *New Developments in Zeolite Science and Technology* (eds Murakami, X., IIjima, A. & Ward, J. W.) 13–22 (Elsevier, Amsterdam, 1986) that all extra-large ring structures based upon 4-membered rings will have one-dimensional channel systems, which generally exhibit poor molecule flow characteristics. Because pore systems of greater dimensionality are associated with improved molecular flow and hence improved catalyst performance, materials having both extra-large pore structures and multidimensional channel systems are highly desirable. Meier, supra, has speculated that frameworks having multidimensional extra-large channels would require FDs below 12.

The existence of the beryllosilicate lovdarite lends support to the idea that frameworks based upon 3-membered rings can be synthesized. See, M. E. Davis, *Nature*, 337, 117 (1989). However, the presence of highly toxic beryllium tends to exclude lovdarite from practical applications.

Zincosilicates are known which contain 3-membered rings. Hemimorphite, described by H. F. W. Taylor, *Amer. Min.*, 47, 932 (1962) and willemite, described by C. Hang, M. A. Simonov and N. V. Belov, *Soviet Physics-Crystallography*, 15, 387 (1970) are examples of such materials. However, these materials do not possess framework densities of less than 21. H. Okaniwa and S. Kasahara in Japanese Kokai Tokkyo Koho 89, 122,916, May 16, 1989; Appl. Nov. 6, 1987 have described a crystalline zinc silicate having a composition $(1 \pm 0.3)M_{2/n}O \cdot aZnO \cdot (1-a) Al_2O_2 \cdot xSiO_2$ ($0 < a \leq 1$, $(2-a) \leq x \leq 20$, M=cation, n=valency of M, and a characteristic X-ray diffraction pattern. Further examples of zincosilicates are set out in U.S. Pat. No. 4,329,328 to McAnespie et al. and U.S. Pat. No. 4,670,617 to DeSimone et al., the contents of which are incorporated herein by reference.

SUMMARY OF THE INVENTION

Described herein are crystalline compositions, e.g. zincosilicates, having a characteristic X-ray diffraction pattern. Another aspect of the invention relates to crystalline zincosilicates having a crystalline framework containing three-membered rings and a framework density of less than 21 tetrahedral atoms per cubic nanometer. The compositions of the present invention can contain framework Zn and exhibit ion-exchange properties. Moreover, these materials are highly porous (as reflected by their low framework density) and possess multidimensional (e.g., 3-dimensional) intersecting channels with pores having at least one diameter larger than 4 angstroms, e.g. 8-membered rings, or even larger than 8 anstroms.

BRIEF DESCRIPTION OF THE DRAWINGS

FIG. 3 depicts the X-ray diffraction pattern of the product of Example 5 obtained by packing the sample in a flat plate holder (FIG. 3a), the product of Example 5 obtained by placing the sample in a glass capillary in order to minimize orientation effects (FIG. 3b) and the X-ray diffraction pattern based on the predicted crystal framework topology of the zincosilicates of the present invention (FIG. 3c).

DETAILED DESCRIPTION OF THE INVENTION

In one embodiment, the present composition is a crystalline material which exhibits an X-ray diffraction pattern which distinguishes it from other prior crystalline compositions. The X-ray diffraction pattern of this compositon may have the following characteristic values:

TABLE 1A

| 2-theta | d-spacing (A) | I/I₀ |
|---|---|---|
| 6.76 | 10.161 ± 0.8 | 9 |
| 10.85 | 6.340 ± 0.3 | 100 | and more specifically the following characteristic values:

TABLE 1B

| 2-theta | d-spacing (A) | I/I₀ |
|---|---|---|
| 6.76 | 10.161 ± 0.8 | 9 |
| 10.85 | 6.340 ± 0.3 | 100 |
| 13.56 | 5.078 ± 0.2 | 25 |
| 13.98 | 4.927 ± 0.1 | 20 |

(Synchrotron X-ray wavelength=1.2186 angstroms) and even more specifically the following characteristic values:

TABLE 1C

| 2-theta | d-spacing (A) | I/I₀ |
|---|---|---|
| 3.38 | 20.300 ± 1.5 | 1 |
| 6.76 | 10.161 ± 0.8 | 9 |
| 10.85 | 6.340 ± 0.3 | 100 |
| 12.82 | 5.370 ± 0.2 | 1 |
| 13.56 | 5.078 ± 0.2 | 25 |
| 13.98 | 4.927 ± 0.1 | 20 |
| 16.98 | 4.061 ± 0.1 | 3 |
| 20.40 | 3.385 ± 0.1 | 27 |
| 21.04 | 3.284 ± 0.1 | 16 |
| 21.60 | 3.199 ± 0.1 | 29 |
| 21.80 | 3.170 ± 0.1 | 26 |
| 22.12 | 3.125 ± 0.1 | 39 |
| 23.16 | 2.987 ± 0.1 | 12 |

(Synchrotron X-ray wavelength=1.2186 angstroms)

Figure 5A:
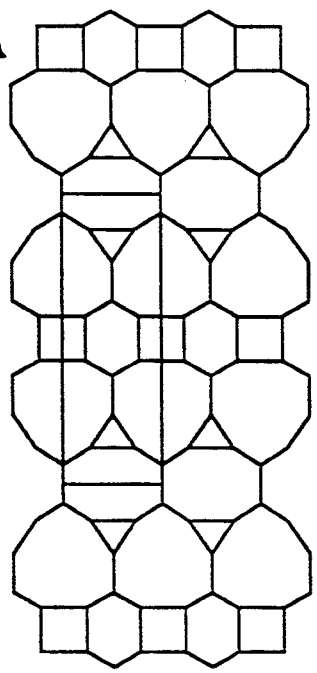
FIG 5 depicts the 100 projection of the tetrahedral framework topology of (a) lovdarite (LVO) and (b) the crystalline composition (zincosilicate) of the present invention. The unit cell projections are outlined by rectangles.
Figure 5B:
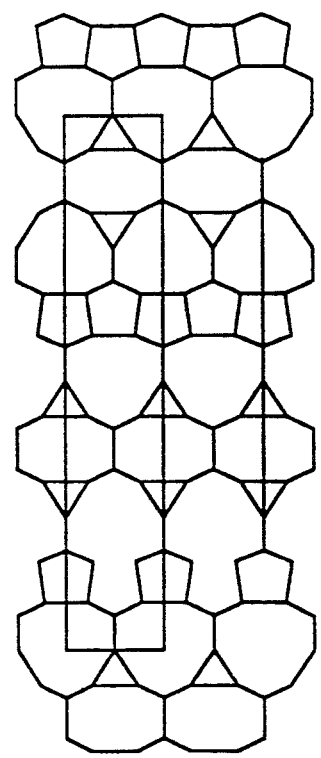

The X-ray diffraction lines in Tables 1A, 1B and 1C identify a crystal framework topology in the composition exhibiting a maximum topological symmetry of I$^-$4m2. The framework can be derived from the lovdarite framework topology (P4$_2$/mmc) by a translation of a/2+b/2 which transforms the layer of alternating of 4- and 6-member rings in lovdarite into a layer of 5-member rings. As a result of the translation, the c dimension of the present crystalline material is roughly double that of the maximum lovdarite topology of P4$_2$/mmc. The present composition is believed to be comprised of 3-, 4-, 5-, 8- and 9-membered rings; the unit cell dimensions are: a=b=7.1791A and c=40.6194A. FIG. 5 sets out the 100 projections of the tetrahedral framework topology of lovdarite (FIG. 5a) and the crystalline composition of the present invention (FIG. 5b).

X-ray diffraction data were obtained from both a conventional tube source and from a synchrotron source. The conventional sealed tube source produced copper K-alpha radiation which was used with a conventional parafocusing X-ray diffractometer. The synchrotron data were obtained from the X-7A beam line at the Brookhaven National Laboratory, National Synchrotron Light Source The synchrotron data were collected on a diffractometer employing plane wave geometry This experimental arrangement facilitated collecting data from a rotating capillary sample which minimizes preferred orientation effects illustrated in FIG. 3. The positions of the peaks, expressed in degrees 2 theta, where theta is the Bragg angle, were determined by scanning 2 theta. The interplanar spacings, d, measured in Angstrom units (A), and the relative intensities of the lines, I/I$_o$, where I$_o$ is one-hundredth of the intensity of the strongest line, including subtraction of the background, were derived from the experimental X-ray pattern.

Ion exchange of cations with other ions results in a composition which reveals substantially the same X-ray diffraction pattern with some minor shifts in interplanar spacing and variation in relative intensity. Relative intensity of individual lines may also vary relative the strongest line when the composition is chemically treated, such as by dilute acid treatment. Other variations can occur, depending on the zinc/silicon, silicon/aluminum, and M/silicon ratios of the particular sample, as well as its degree of thermal treatment. The relative intensities of the lines are also susceptible to changes by factors such as sorption of water, hydrocarbons or other components in the channel structure. Further, the optics of the X-ray diffraction equipment can have significant effects on intensity, particularly in the low angle region. Intensities may also be affected by preferred crystallite orientation as illustrated in FIG. 3. A summary of factors affecting X-ray diffraction characteristics of catalysts is found in ACS Symposium Series 411, Characterization and Catalyst Development, Rohrbaugh and Wu, "Factors Affecting X-ray Diffraction Characteristics of Catalyst Materials", pp. 279 to 302.

In one embodiment, the crystalline zincosilicate materials of the present invention can be characterized by the composition formula:

$$(0.9\pm0.2)M_{2/n}O:aZnO:(1-a)Al_2O_3:xSiO_2:yH_2O$$

wherein $0<a\leq1$, $(2-a)\leq x\leq100$, $0<y<100$ and M represents a cation or cations of valence n.

Framework density (FD) is defined as the the number of tetrahedral atoms (T-atoms per nm$^3$). For the present composition having tetragonal symmetry which is an orthogonal system and having unit-cell dimensions a=b=7.179 A and c=40.62 A, the unit-cell volume can be calculated by the equation:

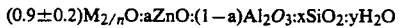

$$V = a \times b \times c$$

resulting in a volume of 2.093 nm$^3$. Given a crystal structure having 36 tetrahedral atoms per unit cell, the composition of the present invention has a framework density of 36 T-atoms / 2.093nm$^3$ = 17.2 T-atoms / nm$^3$.

The composition of the invention can be prepared from a reaction mixture containing sources of ZnO, SiO$_2$, Al$_2$O$_3$, water, at least one cation M selected from the group consisting of alkali and alkaline earth metals, having a valence of n, and an organic directing agent (DA), having a composition, in terms of mole ratios, within the following ranges:

| | Broad | Preferred | Most Preferred |
|---|---|---|---|
| SiO$_2$/ZnO | 1 to 200 | 3 to 50 | 5 to 40 |
| Al$_2$O$_3$/SiO$_2$ | 0 to 0.2 | 0 to 0.1 | 0 to 0.05 |
| DA/SiO$_2$ | 0 to 5 | .05 to 3 | 0.1 to 0.2 |
| H$_2$O/SiO$_2$ | 5 to 80 | 10 to 50 | 20 to 40 |
| M$_{2/n}$O/SiO$_2$ | 0.01 to infinity | 0.1 to 10 | 0.2 to 1 | and thereafter maintaining the reaction mixture under sufficient conditions until crystals of said zincosilicate composition are formed. The order of addition of the reactants is not believed critical although a typical procedure involves dissolving the source of zinc and the source of metal oxide M in water to form a clear solution, followed by addition of the source of silicon and the optional directing agent, DA followed by exposure of the resulting mixture to crystallizing conditions.

Such conditions include exposure to temperatures from ambient to about 250° C., preferably 125° to 225° C., e.g. 150° to 200° C. for periods ranging from 1 to 1500 hours, preferably 3 to 300 hours, and more preferably 5 to 50 hours, e.g. 35 to 45 hours. The crystallization can be carried out under stirring or agitation, e.g. in a rocker bomb.

Sources of oxides of silicon used in this invention can include silicic acid, sodium silicate, tetraalkyl silicates and Ludox TM, a stabilized polymer of silicic acid manufactured by E. I. DuPont de Nemours & Co, e.g. Ludox TM HS-40. The oxide of zinc source can be a water-soluble zinc compound such as zinc oxide, zinc carbonate, zinc nitrate or zinc acetate or other zinc compounds having an easily removable cation e.g. by calcination prior to use of the crystallized zincosilicate. Sources of aluminum oxide include, as non-limiting examples, any known form of aluminum oxide or hydroxide, organic or inorganic salt or compound, e.g. alumina and aluminates.

The organic directing agent DA can be selected from compounds containing elements of Group VA of the Periodic Table of Elements, particularly nitrogen, phosphorus, arsenic and antimony, preferably N or P and most preferably N, which compounds also contain at least one alkyl or aryl group having from 1 to 8 carbon atoms. Representative nitrogen-containing compounds for use as directing agents are the amines and quaternary ammonium compounds, the latter being represented generally by the formula $R_4N^+$ wherein each R is an alkyl or aryl group containing from 1 to 8 carbon atoms. Polymeric quaternary ammonium salts such as $[(C_{14}H_{32}N_2)(OH)_2]_x$ wherein "x" has value of at least 2 are also suitably employed. Both mono-, di- and triamines are advantageously utilized, either alone or in combination with a quaternary ammonium compound or other templating compound. Representative organic directing agents include tetramethylammonium, tetraethylammonium, tetrapropylammonium, and tetrabutylammonium ions; di-n-propylamine; tripropylamine; triethylamine; triethanolamine; piperidine; cyclohexylamine; di-n-butylamine; neopenytlamine; di-n-pentylamine; isopropylamine; t-butylamine; ethylenediamine; pyrollidine; and 2-imidazolidone.

The crystalline material formed can be separated and recovered by known means such as filtration with aqueous washing. This material can be mildly dried for anywhere from a few hours to a few days at varying temperatures, typically about 50° to 225° C., to form a dry cake which can be crushed to a powder or to small particles and extruded, pelletized, or made into forms suitable for its intended use. Typically, materials prepared after drying contain the organic directing agent compound, if used during synthesis, and water of hydration within the solid mass and a subsequent activation or calcination procedure is necessary, if removal of such material is desired. Typically, the dried product can be calcined at temperatures ranging from about 25° to 250° C. and preferably from about .75° to 150° C. Extreme calcination temperatures or prolonged calcination periods may prove detrimental to the crystal structure or may totally destroy it.

The framework atoms of the present composition can be substituted by other atoms utilizing conventional framework substitution techniques, e.g. those set out in U.S. Pat. Nos. 4,645,864; 4,711,970; and 4,788,169 each of which is incorporated herein by reference. For example, it is contemplated that zinc atoms in the framework can be partially or completely substituted by atoms selected from Group IIA and Group IIB of the Periodic Table such as those selected from the group consisting of Be, Mg, Ca, Sr, Ba, and Cd. Similarly, the silicon atoms in the framework can be partially or completely substituted by atoms selected from Group IVB and Group IIIA of the Periodic Table such as those selected from the group consisting of Ge, Sn, B, Al, Ga and In.

The original cations M of the as-synthesized present composition can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the composition catalytically active or control catalytic activity, especially for hydrocarbon conversion. These include hydrogen, rare earth metal and metals of Groups IA, IIA, IIIA, IVA, IB, IIB, IIIB, IVB, VIB and VIII of the Periodic Table of the Elements.

The crystalline composition of this invention may be converted to the dry, hydrogen form by the above thermal treatment of the organic cation-containing form or hydrogen ion precursor-containing form resulting from ion exchange.

In a particularly preferred embodiment, M comprises one or more alkali metal ions. For example, K and Na can be added to form a reaction mixture containing K/Na molar ratios ranging from 0 to 10, preferably 0 to 0.33. In a preferred embodiment NaOH and KOH are employed as sources of the alkali metal ions.

During heating and maintaining the reaction mixture at the desired temperature, the pH must be carefully controlled to avoid acidic conditions. Advantageously, the pH of the reaction mixture falls between 5 and 14, more preferably between 8 and 13 and most preferably between 11 and 12. Control of pH can be accomplished by adjusting the concentration of the added organic and/or inorganic base(s).

The composition prepared by the instant invention can be shaped into a wide variety of particle shapes of varying sizes. Generally speaking, the particles can be in the form of a powder, a granule, or a molded product, such as an extrudate having particle size sufficient to pass through a 2 mesh (Tyler) (25mm) screen and be retained on a 400 mesh (Tyler)(0.037mm) screen. In cases where the catalyst is molded, such as by extrusion, the crystals can be extruded before drying or partially dried and then extruded.

It may be desired to incorporate the new composition with another material, i.e. a matrix, resistant to the temperatures and other conditions employed in various organic conversion processes. Such materials include active and inactive material and synthetic or naturally occurring zeolites as well as inorganic materials such as clays, silica and/or metal oxides, e.g. alumina. The latter may be either naturally occurring or in the form of gelatinous precipitates or gels including mixtures of silica and metal oxides. Catalyst compositions containing the present composition will generally comprise from about 1% to 90% by weight of the present composition and from about 10% to 99% by weight of the matrix material. More preferably, such catalyst compositions will comprise from about 2% to 80% by weight of the present composition and from about 20% to 98% by weight of the matrix.

Use of a material in conjunction with the new composition, i.e. combined therewith, which is active, tends to alter the conversion and/or selectivity of the overall catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It may be desirable to provide a catalyst having good crush strength because in commercial use it is desirable to prevent the catalyst from breaking down into powder-like materials. These clay binders have been employed normally only for the purpose of improving the crush strength of the overall catalyst.

Naturally occurring clays which can be composited with the new crystal include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the present composition can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia. The relative proportions of finely divided crystalline material and inorganic oxide gel matrix vary widely, with the crystal content ranging from 1 to 90 percent by weight and more usually, particularly when the composite is prepared in the form of beads, in the range of 2 to 80 weight percent of the composite.

Employing a catalytically active form of the present composition as a catalyst component, said catalyst possibly containing additional hydrogenation components, reforming stocks may be reformed employing a temperature of from 370° C. to 540° C., a pressure of from 100 psig to 1000 psig (791 to 6996 kPa), preferably from 200 psig to 700 psig (1480 to 4928 kPa), a liquid hourly space velocity is from 0.1 to 10, preferably from 0.5 to 4, and a hydrogen to hydrocarbon mole ratio of from 1 to 20, preferably from 4 to 12.

A catalyst comprising the present composition may also be used for hydroisomerization of normal paraffins, when provided with a hydrogenation component, e.g. platinum. Such hydroisomerization is carried out at a temperature of from 90° C. to 375° C., preferably from 145° C. to 290° C., with a liquid hourly space velocity of from 0.01 to 2, preferably from 0.25 to 0.50, and with a hydrogen to hydrocarbon mole ratio of from 1:1 to 5:1. Additionally, such a catalyst may be used for olefin or aromatic isomerization, employing a temperature of from 200° C. to 480° C.

Such a catalyst may also be used for reducing the pour point of gas oils. This reaction can be carried out at a liquid hourly space velocity of from 10 to 30 and at a temperature of from 425° C. to 595° C.

Other reactions which may be accomplished employing a catalyst comprising the composition of this invention containing a metal, e.g. platinum, include hydrogenation-dehydrogenation reactions and desulfurization reactions, olefin polymerization (oligomerization) and other organic compound conversions, such as the conversion of alcohols (e.g. methanol) or ethers (e.g. dimethylether) to hydrocarbons, and the alkylation of aromatics (e.g. benzene) in the presence of an alkylating agent (e.g. ethylene).

In order to establish the presence of 3-membered rings in the zincosilicates prepared according to the present invention, such materials were analyzed by Si NMR. Based on the known Si NMR chemical shift for the zincosilicates hemimorphite and willemite, materials having a framework density of greater than 21, at −71.0 ppm and −77.9 ppm, respectively, it was assumed that a zincosilicate which contains 3-membered rings would have a Si NMR peak with a chemical shift in the range of −70 ppm to −80 ppm, preferably −75 to −80 ppm.

In order to more fully illustrate the nature of the invention and the manner of practicing same, the following examples are presented.

EXAMPLE 1

A zincosilicate material was prepared from a forming mixture of the following oxide ratios:

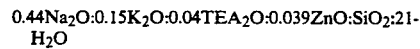

Figure 1:
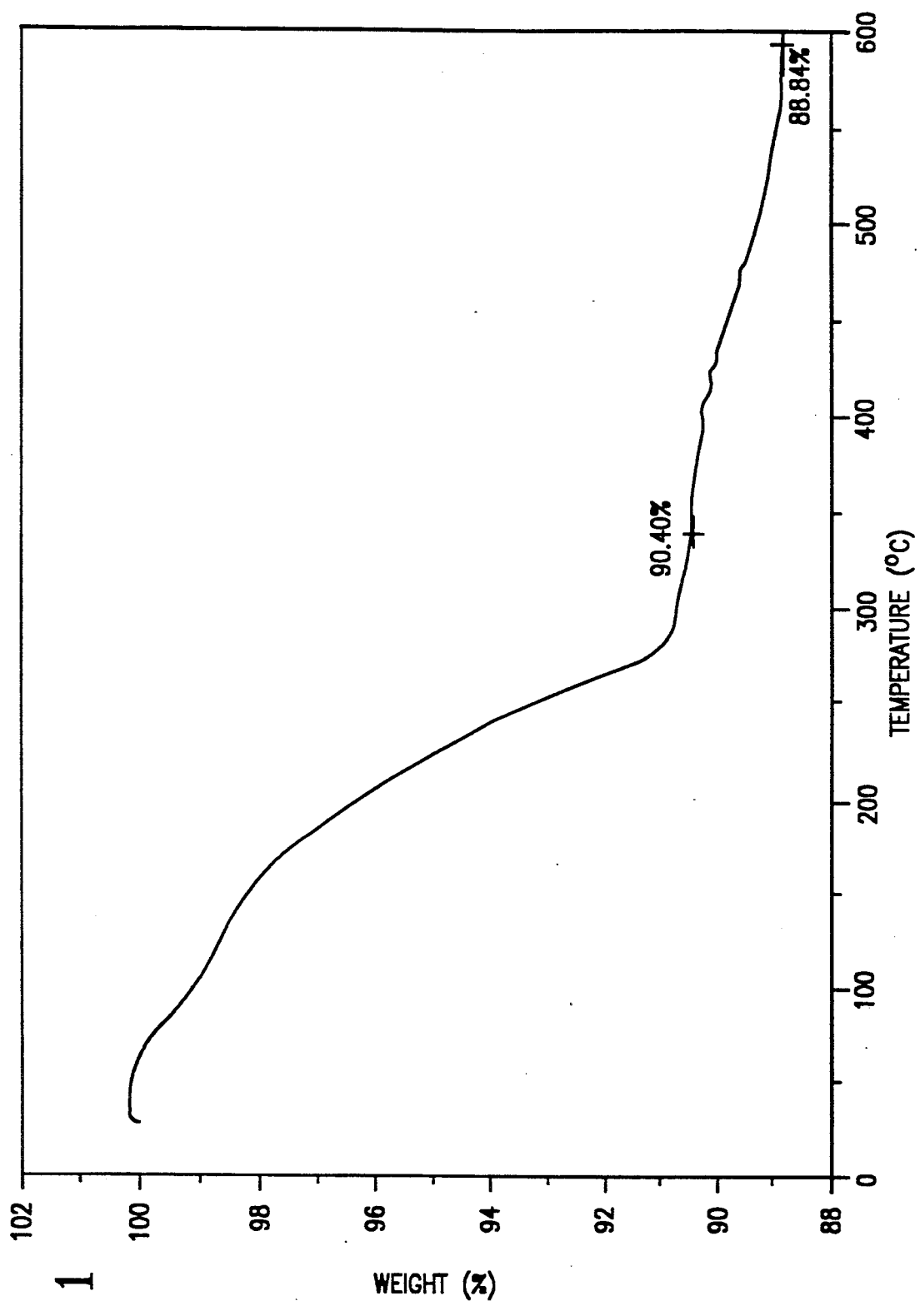
FIG. 1 shows the thermogravimetric analysis (weight loss due to water and organic displacement) for the product of Example 2.

Said mixture was prepared by combining:

| | |
|---|---|
| 2.34 g | NaOH |
| 1.16 g | KOH |
| 0.3269 g | $ZnCO_3$ |
| 20.02 g | $H_2O$ | and was stirred about 7 minutes, resulting in the formation of a clear solution. At this point 10.033 g Ludox HS-40 (4g $SiO_2$) were added, followed by the addition 4 minutes later of 3.8765 g of 20 wt% tetraethylammonium hydroxide (TEAOH) resulting in the formation of a cloudy white solution. 37 minutes later, two aliquots of 25 ml were charged to a bomb at 200° C. and 150° C., where they were maintained for about 47 and 51 hours respectively. The sample collected from the 150° C. bomb was completely amorphous. The 200° C. bomb product was crystalline and exhibited birefringence and an XRD pattern similar to lovdarite. This sample collapsed upon thermogravimetric analysis at 300° C. Weight loss at 88.26% for the sample compared closely with that of 88.07% for lovdarite. The weight loss for water and organic materials in the sample is depicted in FIG. 1. The thermal trace for lovdarite appears similar to water loss for a zeolite. The trace for the sample of the 200° C. bomb is more convex with a second weight loss near 350° C.

EXAMPLE 2

A zincosilicate material was prepared from a forming mixture of the following oxide ratios:

$0.44Na_2O:0.15K_2O:0.04TEA_2O:0.039ZnO:SiO_2:22-H_2O$

Said mixture was prepared by combining:

| |
|---|
| 9.304 g NaOH |
| 4.511 g KOH |
| 1.319 g ZnCO_3 |
| 80 g H_2O | and was stirred about 12 minutes, resulting in the formation of a clear solution. At this point 40.114 g Ludox HS-40 (16 g SiO$_2$) were added, followed by the addition 5 minutes later of 15.329 g of 20 wt% tetraethylammonium hydroxide (TEAOH) resulting in the formation of a solution having a pH of 11.2. 40 minutes later, one 25 ml portion and three aliquots of 45 ml were prepared and charged to an oven at 200° C. The 25 ml portion was removed about 18 hours later and the product collected exhibited only one X-ray diffraction peak near 6° 2-theta.

Figure 2:
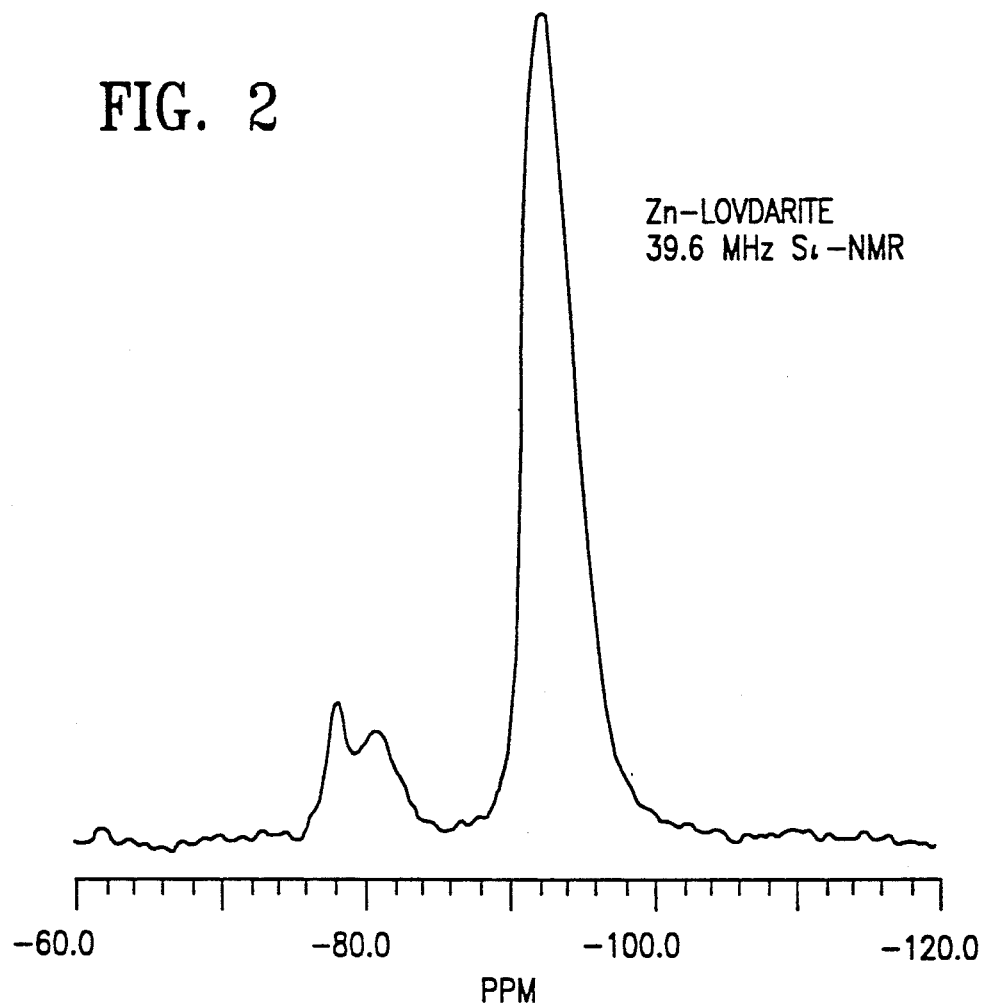
FIG. 2 depicts the $^{29}Si$ NMR spectrum of the product of Example 2.

Two 45 ml portions were removed 48 hours later and the product collected exhibited the X-ray diffraction characteristics of Table 1A. This sample was analyzed by $^{29}$Si NMR and its spectrum set out in FIG. 2 contains a peak at −78 ppm suggestive of the presence of 3-membered rings. The thermal analysis trace (TGA) of this material is shown in FIG. 1. Elemental analysis indicated the material contained:
<0.5 wt% N
9.95 wt% Na
11.40 wt% Zn
22.01 wt% Si
3.27 wt% K
indicating an empirical formula of:

$K_{3.22}Na_{16.27}(Zn_{6.54}Si_{29.46})O_{72} \cdot 13.3\ H_2O.$

In comparison, idealized lovdarite has an empirical formula of:

$K_4Na_{12}(Be_8Si_{28}O_{72}) \cdot 18\ H_2.$

Figure 4:
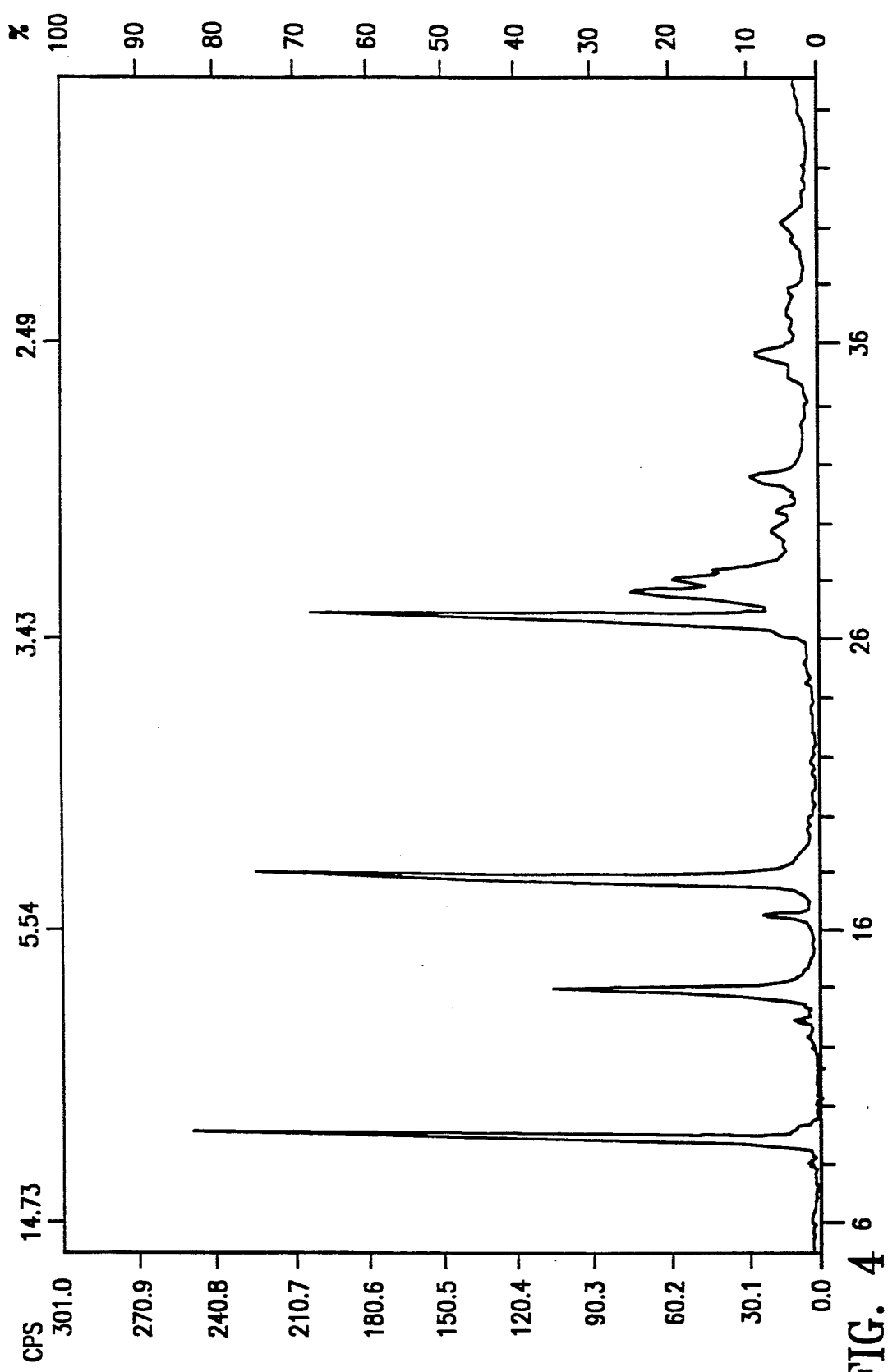
FIG. 4 depicts the X-ray diffraction pattern of the product of Example 2.

The remaining 45 ml aliquot was removed after about 432 hours. The product exhibited X-ray diffraction patterns conforming with Table 1A. The X-ray diffraction pattern is shown in FIG. 4.

EXAMPLE 3

A zincosilicate material was prepared from a forming mixture of the following oxide ratios:

$0.44Na_2O:0.15K_2O:0.04TPA_2O:0.046ZnO:SiO_2:22-H_2O$

Said mixture was prepared by combining:

| |
|---|
| 9.335 g NaOH |
| 4.484 g KOH |
| 1.335 g ZnO |
| 80 g H_2O | and was stirred about 18 minutes, resulting in the formation of a clear solution. At this point 40.584 g Ludox HS-40 (16 g SiO$_2$) were added, followed by the addition 7 minutes later of 10.8714 g of 40 wt% tetrapropylammonium hydroxide (TPAOH) resulting in the formation of a solution having a pH of 11.2. After 2 hours, five 25 ml portions and two aliquots of 45 ml were prepared.

All but two 25 ml portions were charged to an oven at 200° C. The first 25 ml portion was removed from the 200° C. oven after about 18 hours and 40 minutes and consisted of amorphous material. A sample was removed from a 25 ml portion at 200° C. after 48 hours and the remainder of the portion was put back into the 200° C. oven. The sample collected contained some amorphous material and crystalline material with X-ray diffraction characteristics of Table 1. The remainder of the sampled portion was removed after an additional 24 hours of heating. The crystalline product collected had X-ray diffraction characteristics as in Table 1. The third 25 ml portion was removed from the 200° C. oven after about 144 hours of heating and exhibited the X-ray diffraction characteristics of Table 1A.

The first 45 ml portion was removed from the 200° C. oven after about 400 hours and exhibited the X-ray diffraction characteristics of Table 1A. The second 45 ml portion was removed from the 200° C. oven after about 570 hours. The recovered product exhibited the X-ray diffraction characteristics of Table 1A.

The remaining two 25 ml portions were charged to an oven at 150° C. The first 25 ml portion was removed from the 150° C. oven after about 400 hours of heating. The recovered product contained amorphous material as well as material exhibiting the X-ray diffraction characteristics of Table 1A. The remaining 25 ml portion was removed from the 150° C. oven after about 1232 hours and the recovered product contained amorphous material as well as material exhibiting the X-ray diffraction characteristics of Table 1A.

EXAMPLE 4

A zincosilicate material was prepared from a forming mixture of the following oxide ratios:

$0.44Na_2O:0.15K_2O:0.039ZnO:SiO_2:22H_2O$

Said mixture was prepared by combining:

| |
|---|
| 4.632 g NaOH |
| 2.2713 g KOH |
| 0.4704 g ZnO |
| 40 g H_2O | and was stirred 13 minutes, resulting in the formation of a clear solution. At this point 20.0001 g Ludox HS-40 (8 g SiO$_2$) were added. After 20 minutes, the pH was measured as 11.3. Two minutes later the mixture was charged to 25 and 45 ml containers which were maintained at 150° C. and 200° C., respectively. A sample from the portion in the 200° C. oven was removed after 56 hours and the remainder was returned to the oven. The product collected exhibited the X-ray diffraction characteristics of Table 1A. The remainder of the 45 ml portion was removed after an additional 92 hours. The product collected exhibited X-ray diffraction characteristics of Table 1A.

The 25 ml portion maintained at 150° C. was removed from the oven after about 432 hours. The product collected had X-ray diffraction characteristics of Table 1A.

The products of this example indicate that zincosilicates comprising three-membered rings and low framework densities can be prepared in the absence of organic directing agent.

EXAMPLE 5

A zincosilicate material was prepared from a forming mixture of the following oxide ratios:

0.44Na$_2$O:0.04TEA$_2$O:0.286ZnO:SiO$_2$:44H$_2$O said mixture was prepared by combining:

| |
|---|
| 4.4 g ZnO |
| 3.2 g TEABr |
| 6.8 g NaOH |
| 120 g H$_2$O | and was stirred about 7 minutes. The resulting solution was poured into 11.4 g amorphous SiO$_2$ (Cabosil ™ grade EH-5) and stirred for 3 minutes after which an additional 30 ml of deionized H$_2$O was added. The resulting solution was stirred for 54 minutes. The reaction mixture was divided into 5 portions and charged to 45 ml autoclaves and put into a 200° C. oven. All five portions were removed after about 284 hours. The collected product had X-ray diffraction characteristics of Table 1A. Elemental analysis for zinc, silicon and sodium of a similarly-made sample was as follows: 10.83 wt% Na, 19.75 wt% Zn and 22.44 wt% Si. The powdered product was exchanged with ammonium ions by refluxing a solution of 0.667 M ammonium hydroxide and 0.333 M ammonium acetate at 110° C. for 4 hours. The resulting crystalline product had synchrotron X-ray diffraction patterns as shown in FIG. 3A (obtained by placing the sample between flat plates) and FIG. 3B (obtained by placing the sample in a capillary in order to minimize orientation effects) and listed in Tables 2 and 3. The resulting patterns can be seen to closely match the computer-predicted pattern set out in FIG. 3C.

EXAMPLE 6

A zincosilicate material was prepared from a forming mixture of the following oxide ratios:

0.4Na$_2$O:0.04TEA$_2$O:0.286ZnO:SiO$_2$:44H$_2$O prepared by combining

| |
|---|
| 5.3563 g NaOH |
| 2.9361 g TEABr |
| 4.0722 g ZnO |
| 66 g H$_2$O | and stirring the resulting solution for 9 minutes. 9.9868 g amorphous SiO$_2$ (Davidson) were added and the resulting mixture stirred for 11 minutes after which an additional 66 ml H$_2$O were added and the resulting mixture stirred for 127 minutes. The solution was divided into 5 portions and charged to 45 ml autoclaves and placed in a 200° C. oven for 312 hours. Upon removal the collected product exhibited X-ray diffraction characteristics of Table IA plus an impurity peak near 6° 2-theta.

EXAMPLE 7

A zincosilicate material was prepared from a forming mixture of the following oxide ratios:

0.77Na$_2$O:0.07TEA$_2$O:0.63ZnO:SiO$_2$:77H$_2$O prepared by combining

| |
|---|
| 2.0 g NaOH |
| 1.0 g TEABr |
| 1.6 g ZnO |
| 46 g H$_2$O | and stirring the resulting solution for 6 minutes. 2.0 g fumed silica (Cabosil grade EH-5) were added and the resulting mixture stirred for 29 minutes. The solution was divided into 2 portions and charged to a 25 ml and a 45 ml autoclave which were placed in a 200° C. oven. The 25 ml portion was removed after 144 hours and the product collected contained amorphous material, zincite (ZnO) and material with X-ray diffraction characteristics of Table 1A. The 45 ml portion was removed after 288 hours. Upon removal the collected product exhibited X-ray diffraction characteristics of Table 1A.

EXAMPLE 8

A zincosilicate material having a higher Zn/Si ratio was prepared from a forming mixture of the following oxide ratios:

1.2Na$_2$O:0.1TEA$_2$O:0.75ZnO:SiO$_2$:116H$_2$O prepared by combining

| |
|---|
| 1.6 g NaOH |
| 0.7 g TEABr |
| 1.0 g ZnO |
| 35 g H$_2$O | and stirring the resulting solution for 3 minutes. 1.0 g fumed silica (Cabosil grade EH-5) were added and the resulting mixture stirred for 9 minutes. The solution was divided into 2 portions and charged to a 15 ml and a 45 ml autoclave which were placed in a 200° C. oven. The 15 ml portion was removed after 144 hours and the product exhibited an unidentified X-ray diffraction pattern. The 45 ml portion was removed after 408 hours. Upon removal the collected product exhibited X-ray diffraction characteristics of the 3-membered ring-containing mineral hemimorphite plus a small amount of an impurity phase.

EXAMPLE 9

A zincosilicate material is prepared from a forming mixture of the following oxide ratios:

0.44Na$_2$O:0.04TEA$_2$O:0.039ZnO:SiO$_2$:22H$_2$O prepared by combining

| |
|---|
| 18.5 g NaOH |
| 1.6 g ZnO |
| 160 g H$_2$O | and stirring the resulting solution for 6 minutes. 80.1 g of colloidal silica (Ludox HS-40) are added and the resulting mixture stirred for 8 minutes after which 30.3 g TEAOH (20wt%) are added and the resulting solution stirred for 5 minutes. The resulting mixture is charged to a stirred reactor and one 45 ml autoclave. The stirred reactor is heated at 190° C. and the 45 ml portion is heated at 200° C. The 45 ml portion is removed after 95 hours and the collected product exhibits the X-ray diffraction characteristics of Table 1A. The stirred reactor is shut down after 120 hours and the collected product exhibits X-ray diffraction characteristics of Table 1A.

EXAMPLE 10

A zincosilicate material was made from a forming mixture of the following oxide ratios:

$0.3K_2O:0.04TEA_2O:0.3ZnO:SiO_2:22H_2O$ prepared by mixing together:

| 4.496 g KOH |
| 3.265 g ZnO |
| 40 g H$_2$O | which was stirred 7 minutes. 20.105 g Ludox HS-40 (4 g SiO$_2$) were then added and the resulting mixture was stirred for 8 minutes. At this point 7.672 g TEAOH (40 wt%) were added and the resulting mixture stirred for 15 minutes. (After 3 minutes the pH was measured at 11.6.) The resulting solution was charged to two 25 ml and one 15 ml autoclaves which were placed in a 200° C. oven. A portion was also charged to a 25 ml autoclave and placed in an oven at 150° C. The 15 ml portion at 200° C. was removed after heating for 24 hours. The contents were identified as zincite (ZnO). One 25 ml portion at 200° C. was removed after heating for 72 hours. The contents were identified as zincite. The remaining 25 ml portion at 200° C. was removed after heating for 624 hours. The contents exhibited an unidentified X-ray diffraction pattern. The 25 ml portion maintained at 150° C. was removed after 432 hours. The contents were identified as zincite.

EXAMPLE 11

A zincosilicate material was made from a forming mixture of the following oxide ratios:

$0.47Na_2O:0.15K_2O:0.04TEA_2O:0.039ZnO:0.039NaAl_2:SiO_2:22H_2O$ prepared by mixing together:

| 2.3 g NaOH |
| 1.1 g KOH |
| 0.2 g ZnO |
| 0.3 g NaAlO$_2$ |
| 26 g H$_2$O | which was stirred about 7 minutes, resulting in the formation of a clear solution. At this point 2.3 g TEAOH (40 wt%) were added and the resulting mixture stirred for one minute. 10 g Ludox HS-40 (4 g SiO$_2$) were then added. After 47 minutes of stirring the resulting gel was charged into one 45 ml autocalave and one 15 ml autocalave. The autoclaves were then placed in a 200° C. oven. The 15 ml portion was removed after heating for about 23 hours. Only amorphous solid was collected. A sample was removed from the 45 ml portion at 200° C. after 46 hours. The remainder of this portion was returned to the oven. By X-ray diffraction analysis the product appeared to be the mineral phillipsite with some amorphous impurity. The remainder of the 45 ml portion was removed after an additional 24 hours of heating and was determined to be phillipsite.

EXAMPLE 12

A zincosilicate material was made from a forming mixture prepared by mixing together:

| 2.3930 g NaOH |
| 14.2372 g TMAOH (solid) |
| 1.1080 g KOH |
| 0.4355 g ZnO |
| 40 g H$_2$O | which was stirred about 20 minutes, resulting in the formation of a clear solution. At this point 20.327 g Ludox HS-40 (8 g SiO$_2$) were added. After 12 minutes, the pH was measured as 11.5. Two minutes later the mixture was charged to one 45 ml container and two 25 ml containers. One 25 ml container was placed in a 150° C. oven and the remaining containers were placed in a 200° C. oven.

A sample was removed from the 25 ml portion at 200° C. about 19.5 hours later and its pH measured as 11.8. The recovered product was identified as sodalite and amorphous material. These results indicate that tetramethylammonium hydroxide (TMAOH) is a strong template which forms TMA-Sodalite in high Si systems. The remainder of this 25 ml portion was maintained in an oven at 200° C. for an additional 360 hours. Analysis indicated that the recovered product contained a material which exhibited the X-ray diffraction characteristics set out in Table IA as well as quartz. The sample was thermogravimetrically analyzed up to 600° C. The material which exhibited the X-ray diffraction characteristics set out in Table IA collapsed and only the quartz remained.

The 25 ml sample in the 150° C. oven was removed after about 290 hours and its pH was measured as 12.2. The product was collected and its analysis indicated it comprised a material which exhibited the X-ray diffraction characteristics set out in Table 1A as well as an amorphous component.

The 45 ml sample was removed from the 200° C. oven after about 1296 hours. Analysis indicated that the recovered product contained a zincosilicate material which exhibited the X-ray diffraction characteristics set out in Table 1A as well as quartz.

From the foregoing synthesis it can be considered possible that the zinc in the reaction mixture combined with sufficient Si to form the zincosilicate while the remaining Si formed quartz. Despite the potency of TMAOH as a sodalite-forming template, eventually the zincosilicate did form. This indicates a tendency for zincosilicates to form 3-membered ring materials which is greater than the tendency of TMAOH to form sodalite.

It is claimed:

1. A crystalline composition characterized by the X-ray diffraction pattern having the following characteristic values:

| 2-theta | d-spacing (A) | I/I$_0$ |
|---------|---------------|---------|
| 6.76 | 10.161 ± 0.8 | 9 |
| 10.85 | 6.340 ± 0.3 | 100. |

2. The crystalline composition of claim 1 further characterized by the X-ray diffraction pattern having the following characteristic values:

| 2-theta | d-spacing (A) | $I/I_0$ |
| --- | --- | --- |
| 6.76 | 10.161 ± 0.8 | 9 |
| 10.85 | 6.340 ± 0.3 | 100 |
| 13.56 | 5.078 ± 0.2 | 25 |
| 13.98 | 4.927 ± 0.1 | 20. |

3. The crystalline composition of claim 1 further characterized by the X-ray diffraction pattern having the following characteristic values:

| 2-theta | d-spacing (A) | $I/I_0$ |
| --- | --- | --- |
| 3.38 | 20.300 ± 1.5 | 1 |
| 6.76 | 10.161 ± 0.8 | 9 |
| 10.85 | 6.340 ± 0.3 | 100 |
| 12.82 | 5.370 ± 0.2 | 1 |
| 13.56 | 5.078 ± 0.2 | 25 |
| 13.98 | 4.927 ± 0.1 | 20 |
| 16.98 | 4.061 ± 0.1 | 3 |
| 20.40 | 3.385 ± 0.1 | 27 |
| 21.04 | 3.284 ± 0.1 | 16 |
| 21.60 | 3.199 ± 0.1 | 29 |
| 21.80 | 3.170 ± 0.1 | 26 |
| 22.12 | 3.125 ± 0.1 | 39 |
| 23.16 | 2.987 ± 0.1 | 12. |

4. The crystalline composition of claim 1 comprising multidimensional intersecting channels.

5. The crystalline composition of claim 4 wherein said channels define pores with at least one diameter larger than 4 angstroms.

6. A crystalline composition having the 100 unit cell projection set out in FIG. 5b.

7. The crystalline composition of claim 1 which is a crystalline zincosilicate having a crystalline framework containing three-membered rings and having a framework density of less than 21 tetrahedral atoms per cubic nanometer.

8. The zincosilicate of claim 7 having the composition

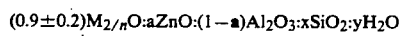

wherein $0 < a \leq 1$, $(2-a) \leq x \leq 100$, $0 \leq y \leq 100$ and M represents a cation or cations of valence n.

9. The zincosilicate of claim 8 wherein $a = 1$.

10. The zincosilicate of claim 8 comprising multidimensional intersecting channels.

11. The zincosilicate of claim 10 wherein said channels define pores with at least one diameter larger than 4 angstroms.

12. The zincosilicate of claim 7 which further exhibits a Si NMR chemical shift ranging from $-70$ to $-80$ ppm.

13. The zincosilicate of claim 7 which has a framework density of less than 18.

14. The zincosilicate of claim 7 which has a framework density of less than 12.5.

15. A method for preparing the zincosilicate composition of claim 7 which comprises preparing a reaction mixture containing sources of ZnO, $SiO_2$, water, at least one cation M selected from the group consisting of alkali and alkaline earth metals, having a valence of n, and an organic directing agent (DA), having a composition, in terms of mole ratios, within the following ranges:

| | |
| --- | --- |
| $SiO_2/ZnO$ | 1 to 200 |
| $Al_2O_3/SiO_2$ | 0 to 0.2 |
| $DA/SiO_2$ | 0 to 5 |
| $H_2O/SiO_2$ | 5 to 80 |
| $M_{2/n}O/SiO_2$ | $\geq 0.01$ | and thereafter maintaining the reaction mixture under sufficient conditions until crystals of said zincosilicate composition are formed.

16. The method of claim 15 wherein M is selected from the group consisting of Na and K in a molar ratio of K/Na ranging from 0 to 10 and said reaction mixture has a composition, in terms of mole ratios, within the following ranges:

| | |
| --- | --- |
| $SiO_2/ZnO$ | 3 to 50 |
| $Al_2O_3/SiO_2$ | 0 to 0.1 |
| $DA/SiO_2$ | .05 to 3 |
| $H_2O/SiO_2$ | 10 to 50 |
| $M_{2/n}O/SiO_2$ | 0.1 to 10 | and a pH ranging from 5 to 14.

17. The method of claim 16 wherein said conditions comprise temperatures from ambient to 250° C. for a period of 1 to 1500 hours, and said directing agent DA is selected from the group consisting of tetramethylammonium, tetraethylammonium, tetrapropylammonium and tetrabutylammonium.

18. The method of claim 16 wherein said conditions comprise temperature of 150° to 200° C. for a period of 3 to 300 hours.

* * * * *